(12) United States Patent
Mendes et al.

(10) Patent No.: US 10,289,473 B2
(45) Date of Patent: May 14, 2019

(54) SITUATION ANALYSIS

(71) Applicant: NetScout Systems, Inc, Westford, MA (US)

(72) Inventors: Ubaldo Anthony Mendes, Westford, MA (US); Amin Arshad Abdulghani, Piscataway, NJ (US); Amreesh Agrawal, Bangalore (IN); Gaurava Kumar, Bangalore (IN)

(73) Assignee: NETSCOUT SYSTEMS, INC., Westford, MA (US)

(*) Notice: Subject to any disclaimer, the term of this patent is extended or adjusted under 35 U.S.C. 154(b) by 162 days.

(21) Appl. No.: 15/467,904

(22) Filed: Mar. 23, 2017

(65) Prior Publication Data

US 2018/0276063 A1 Sep. 27, 2018

(51) Int. Cl.
| | |
|---|---|
| G06F 11/00 | (2006.01) |
| G06F 11/07 | (2006.01) |
| G06F 11/34 | (2006.01) |
| G06F 11/30 | (2006.01) |
| H04L 12/24 | (2006.01) |
| G06F 11/32 | (2006.01) |

(52) U.S. Cl.
CPC ........ G06F 11/079 (2013.01); G06F 11/0709 (2013.01); G06F 11/0751 (2013.01); G06F 11/0793 (2013.01); G06F 11/3006 (2013.01); G06F 11/3409 (2013.01); G06F 11/3495 (2013.01); H04L 41/06 (2013.01); G06F 11/3065 (2013.01); G06F 11/328 (2013.01); G06F 11/3419 (2013.01); G06F 11/3452 (2013.01); G06F 2201/86 (2013.01); G06F 2201/875 (2013.01)

(58) Field of Classification Search
USPC ........................................ 714/2, 25
See application file for complete search history.

(56) References Cited

U.S. PATENT DOCUMENTS

| | | | |
|---|---|---|---|
| 7,131,037 B1 | 10/2006 | LeFaive et al. | |
| 8,738,972 B1 | 5/2014 | Bakman et al. | |
| 9,274,586 B2* | 3/2016 | Iyer ...................... | G06F 1/3209 |
| 2010/0050023 A1 | 2/2010 | Scarpelli et al. | |
| 2014/0095841 A1* | 4/2014 | Doi ..................... | G06F 11/0721 |
| | | | 712/220 |
| 2016/0314033 A1* | 10/2016 | Polychronis .......... | G06F 11/079 |

OTHER PUBLICATIONS

Extended European Search Report for European Patent Application No. EP18163385.0, dated Nov. 2, 2108.
Netscout: "nGeniusONE Platform for Managing Voice, Video Communications in Contact Centers", Dec. 1, 2016 (Dec. 1, 2016), pp. 1-2, XP055493463, Retrieved from the Internet: URL:https://www.netscout.com/sites/default/files/2015/03/netscout-ql-ngeniusone-platform-managing-voice-video-in-contact-centers.pdf [retrieved on Jul. 18, 2018].

* cited by examiner

*Primary Examiner* — Sarai E Butler
(74) *Attorney, Agent, or Firm* — Locke Lord LLP; Scott D. Wofsy; Christopher J. Capelli

(57) ABSTRACT

A method for performing root cause analysis of failures in a computer network is provided. The method includes receiving an Adaptive Service Intelligence (ASI) data set related to one or more failures reported in the computer network from a plurality of interfaces. One or more impact events associated with the reported failures are identified based on the received ASI data set. Each of the identified impact events is correlated with one or more cause events. A situation record is selectively generated based on the correlation results.

40 Claims, 12 Drawing Sheets

| Id | Start Time | End Time | Description | Duration | Interface | Applicat | Server |
|---|---|---|---|---|---|---|---|
| ▼ Link Utilization: IS-77:Remote77 | 09/27/2016 2:00 PM | 09/27/2016 7:00 PM | LINK % Utilization Situation on IS-77:Remote77 | 5 | IS-77:Rem | 414 | 416 |
| ☐ 2001 | 09/27/2016 2:00 PM | 09/27/2016 7:00 PM | NB_SSN_T Server (//ServerNTCT1) LINK % Utilization Total affecting % Timeout | 5 | IS-77:Rem | NB_SSN | //ServerNT |
| ☐ 2003 | 09/27/2016 3:00 PM | 09/27/2016 7:00 PM | DHCP(Ack) Server (DHCPServerCorp) LINK % Utilization Total affecting % Timeout | 4 | IS-77:Rem | DHCP:A | DHCPServe |
| ☐ 2006 | 09/27/2016 3:00 PM | 09/27/2016 6:00 PM | SMB Server (//ServerNTCT1) LINK % Utilization Total affecting % Timeout | 3 | IS-77:Rem | SMB | //ServerNT |
| ▶ Server Bit Rate: Call Manager 12 | 09/27/2016 4:00 PM | 09/27/2016 7:00 PM | Server Bit Rate Situation on Call Manager 12 | 3 | Call Manage 12 | | |
| ☐ 2008 | 09/27/2016 4:00 PM | 09/27/2016 6:00 PM | POP3 Server (Exchange CAS 2) New Sessions affecting % Failure | 2 | IS-77:Rem | POP3 | Exchange CAS 2 |
| ☐ 2010 | 09/27/2016 4:00 PM | 09/27/2016 6:00 PM | HTTP-Exchange Server (Exchange CAS 2) New Sessions affecting % Failure | 2 | IS-77:Rem | HTTP-Exchang | Exchange CAS 2 |
| ☐ 2012 | 09/27/2016 6:00 PM | 09/27/2016 7:00 PM | HTTP-Exchange Server (Exchange CAS 1) New Sessions affecting % Failure | 1 | IS-77:Rem | HTTP-Exchang | Exchange CAS 1 |

FIG. 4

| 1002 — Simple Index | 12 | 11 | 10 | 9 | 8 | 7 | 6 | 5 | 4 | 3 | 2 | 1 | Sum of sample index |
|---|---|---|---|---|---|---|---|---|---|---|---|---|---|
| 1006 — AI Score | 1.5 | 1.5 | 1.5 | 1 | 1.5 | 0 | 0.5 | 0 | 1.5 | 0 | 1 | 1.5 | 78 |
| 1008 — Recency Weight (=sample number/ sum of sample index) | 0.15 | 0.14 | 0.13 | 0.12 | 0.10 | 0.09 | 0.08 | 0.06 | 0.05 | 0.04 | 0.03 | 0.01 | |
| 1010 — Recency Value | 0.15 | 0.14 | 0.13 | 0.12 | 0.10 | 0.00 | 0.00 | 0.00 | 0.05 | 0.00 | 0.03 | 0.01 | |
| 1012 — Continuity Value | 5 continuous samples | | | | | | | | | | | | |
| 1014 — Ensure Index (EI) | | | | | | | | | | | | | |
| 1016 — Recency Score | 73% | | | | | | | | | | | | |
| 1018 — Continuity Score | 42% | | | | | | | | | | | | |
| 1020 — Occurrence Score | 67% | | | | | | | | | | | | |

SITUATION ANALYSIS

FIELD OF THE INVENTION

This specification is directed, in general, to computer networks, and, more particularly, to network prescriptive root cause analysis and performance analysis.

BACKGROUND OF THE INVENTION

In today's highly competitive telecommunications industry, service providers provide customers (subscribers) with a wide variety of voice, data, video, and internet services. Because of the complexity of service provider network systems and network equipment being deployed in the field to provide such services, service providers must utilize highly trained technicians to install and fix problems encountered by subscribers.

Typically, service providers utilize call centers that have trained personnel to answer calls from subscribers, to perform the analysis of the problem and to provide a proposed solution. More technical issues are typically referred to tier 2 and tier 3 technicians. Due to the complexity of the systems involved, such call centers may receive a very large number of support calls from subscribers or technicians in the field. Typically, the trained personnel answering the calls begin troubleshooting by performing triage in order to determine, for example, whether the reported problem is related to either radio or core network, whether the problem is subscriber specific or systemic to a subset of subscribers, and so on. After performing the triage the trained support personnel usually apply their empirical knowledge to ascertain possible root causes of the reported problems and to assist with resolution of such problems. However, such calls can be costly in terms of time and resources needed to train the personnel answering the calls from subscribers, and in terms of the time and resources utilized by employing such trained personnel. Furthermore, reducing mean time to repair (MTTR) became of paramount importance and anything that can reduce it, leads to greater return on investment (ROI) for customers.

Accordingly, it would be advantageous to provide a more efficient troubleshooting process in various computer networks.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for performing root cause analysis of failures in a computer network is provided. The method includes receiving an Adaptive Service Intelligence (ASI) data set related to one or more failures reported in the computer network from a plurality of interfaces. One or more impact events associated with the reported failures are identified based on the received ASI data set. Each of the identified impact events is correlated with one or more cause events. A situation record is selectively generated based on the correlation results.

BRIEF DESCRIPTION OF THE DRAWINGS

The accompanying appendices and/or drawings illustrate various, non-limiting, example inventive aspects in accordance with the present disclosure:

FIG. 4 is an exemplary situation record generated by the method of FIG. 3 in accordance with an illustrative embodiment of the present invention;

FIG. 10 illustrates an example table storing data associated with an algorithm for determining or updating a problem's ensurance index based on persistence of the problem as indicated by observed KPI measures.

DETAILED DESCRIPTION OF CERTAIN EMBODIMENTS

Figure 1:
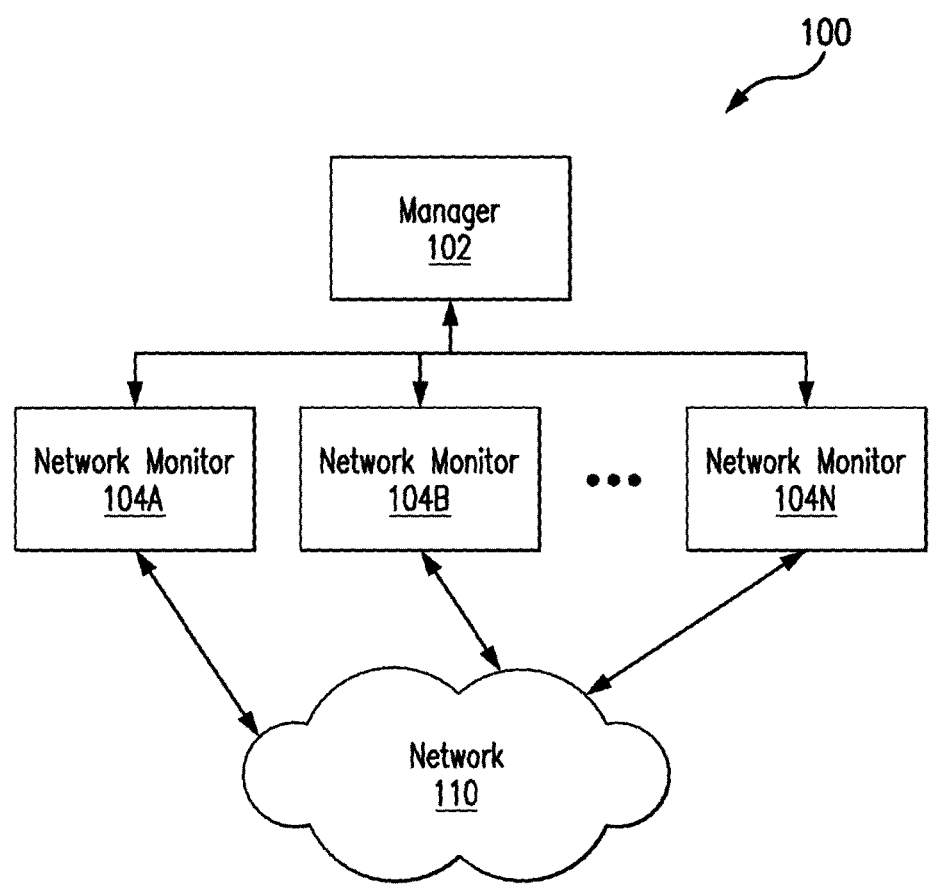
FIG. 1 illustrates the architecture of a system for monitoring data packets, according to one embodiment of the present invention.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Embodiments of the present invention relate to performing root cause analysis of failures in a computer network. A plurality of devices dedicated to monitoring data communicated via the network is used as a data source for the performed analysis. The plurality of devices summarizes a plurality of observed data packets into a compact Adaptive Session Intelligence (ASI) data set for storage and processing. The ASI data set provides the analysis granularity required to extract rich network, service- and user-related metrics on devices, subscribers, base station ID, Location Area (LA), Routing Area (RA), QoS, SITE, Access Point Name (APN), Tracking Area Code (TAC), and VLAN. Each record in the ASI data set may be updated in real-time. Depending on protocols, a network monitoring system extracts different sets of information, removes redundant information from the plurality of data packets, and focuses on the various types of performance problems affecting end users of numerous network applications, such as, but not limited to, average response time (latency), node failure rate (failures), and timeout (availability). The network monitoring system may retrieve and process multiple ASI data set records for the same or different protocols to identify a situation when predefined supported metrics exceed computed baselines or predefined thresholds and to determine when impacted metrics are correlated with matching causal metrics. The impacted metrics are associated with one or more impact events, while the causal metrics are associated with one or more causal events. It should be further noted that the causal events have a causal relationship to the corresponding impact events. Although a number of general and specific examples of the impact events and of the causal events are provided below, it will be appreciated that these examples are intended to be non-limiting, and are provided merely for the sake of example and explanation. The performed analysis enables isolation of the most likely cause for an identified event and enables generation of a situation record and visual presentation of the generated situation record to a user via an interactive Graphical User Interface (GUI). Each situation record describes context of the relationship between impacted metrics and causal metrics. Hence, the network monitoring system can facilitate more efficient and effective analysis of events, issues, performance or conditions of the network.

Overview of System Architecture

FIG. 1 illustrates architecture of a system 100 for monitoring network data packets, according to one embodiment of the present invention. The network system 100 may include, among other components, a manager 102, one or more network monitors 104A through 104N (hereinafter collectively referred to as "the network monitors 104"), and a network 110. The network monitors 104 are connected to the network 110 to monitor network data packets traversing at certain locations or links of the network 110. The locations or the links connected to the network monitors 104 are preferably critical or important locations of the network 110.

The manager 102 is connected to the network monitors 104 to set various operating parameters. Although the manager 102 is illustrated as being directly connected to the network monitors 104, the manager 102 may communicate with the network monitors 104 via the network 110 or other networks. The network monitors 104 may be located remotely from the manager 102. Alternatively, the manager 102 may be co-located with one of the network monitors 104 or embodied in one of the network monitors 104.

The operating parameters set by the manager 102 may include, among others, information stored in an ASI data set, the format of the ASI data set, and lengths of time the ASI data set should be stored. The information stored in the ASI data set may be set per protocol-by-protocol basis, for example.

The manager 102 is hardware, software, firmware or a combination thereof for managing the operation of the network monitors 104. The manager 102 may perform one or more of the following functions: (i) process information based on the ASI data set, (ii) receive parameters from a user for setting operation of the network monitors 104, (iii) send commands to the network monitors 104 to set parameters or preferences for their operations, (iv) present the collected information to the user, (v) provide information about user experience associated with the network 110 (e.g., application or network response time), (vi) associate impact events with cause events and (vii) generate situation records concerning conditions and/or performance of the network 110, as described below in conjunction with network monitor's functionality.

The manager 102 may be embodied as a general purpose computing device installed with specialized software for performing one or more of these operations. Alternatively, the manger 102 is embodied as a specialized computing device. In one embodiment, the manager 102 is a computing device running nGenius ONE, available from NetScout Systems, Inc. of Westford, Mass.

In one embodiment, the manager 102 receives ASI data sets or selectively accesses ASI data sets from the network monitors 104, analyzes or correlates the data sets, and produces multi-source information useful for diagnosis of the network 110 and other purposes. An example ASI data set comprises highly scalable metadata that enables a comprehensive real-time and historic view of service, network, application, and server performance. The ASI data sets are typically generated based upon actual traffic in real time and aggregated at different resolutions. The manager 102 may include a rule-based situation analyzing engine 214, described below in detail. The multi-source information is obtained by processing ASI data sets from multiple source network monitors 104, and hence, may represent overall condition or state of the network 110 or a subset of the network 110. The situation analyzing engine 214 maps impact metrics to cause metrics based on a static set of rules applied to ASI data sets or other information received from the network monitors 104.

The network monitors 104 are hardware, software, firmware or a combination thereof for monitoring data communication at various locations or links of the network 110. Each of the network monitors 104 may be deployed at certain locations or links of the network 110 to collect network data packets traversing the locations or links.

After collecting the network data packets, the network monitors 104 generate ASI data sets based on the received rich packet-flow data, and stores the ASI data. In one embodiment, the ASI data sets are generated and sent to the manager 102. In another embodiment, the ASI data sets are stored as a file in the network monitors 104 and then sent to the manager 102 at a later time.

The network monitor 104 may be a special purpose computing device or a software component (not limited to a single process) dedicated to monitoring data communicated via the network 110. Alternatively, the network monitor 104 may be a general purpose computing device with specialized software components installed thereon. In one embodiment, the network monitor 104 is embodied as nGenius Collectors, nGenius Probes or nGenius InfiniStream, available from NetScout Systems, Inc. of Westford, Mass.

The network 110 may include a cellular network, a local area network (LAN), a wide area network (WAN) (e.g., the Internet) and/or any other interconnected data path across which multiple devices may communicate. The network 110 may include various network devices operating at different levels of protocols.

Example Architecture of Manager/Network Monitor

Figure 2:
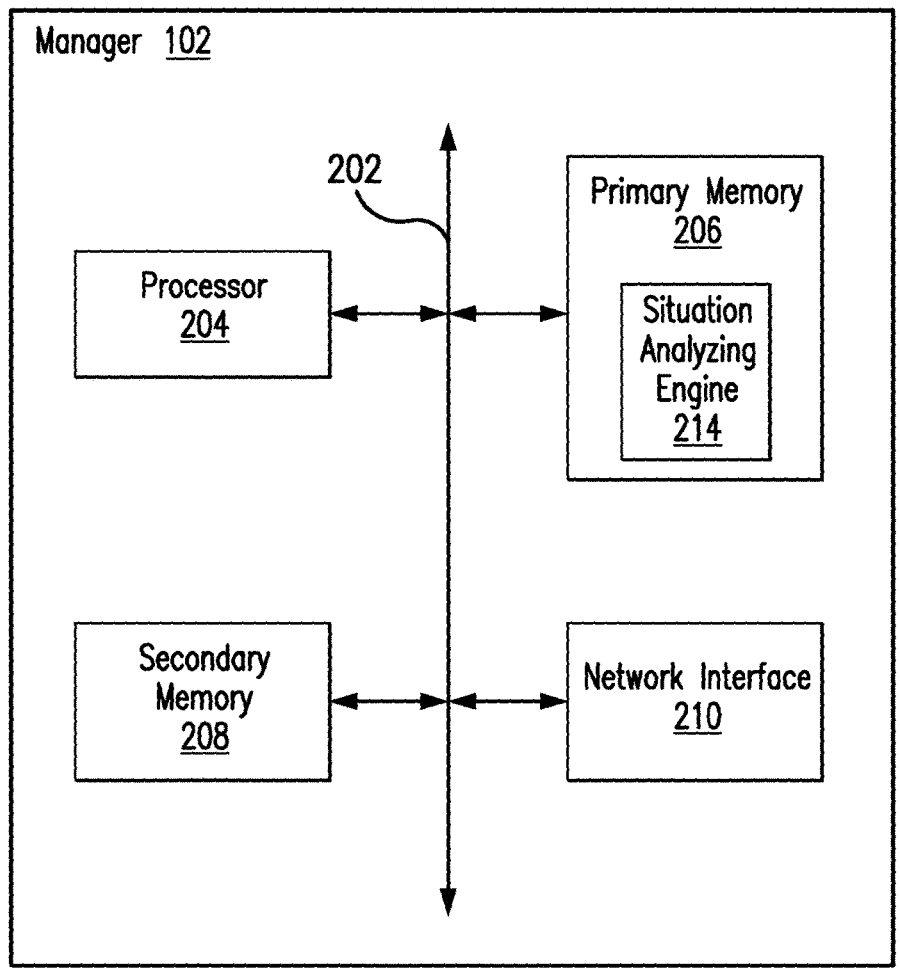
FIG. 2 is a block diagram of the network manager of G. 1, according to one embodiment of the present invention.

FIG. 2 is a block diagram of the manager 102, according to one embodiment of the present invention. The manager 102 may include, among other components, a processor 204, primary memory 206, secondary memory 208, and a network interface 210. These components are connected and communicate via a bus 202. The manager 102 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the manager 102.

The primary memory 206 is a computer readable storage medium that stores, among other data, computer instruction modules for processing, storing and retrieving network data packets and/or ASI data sets. The primary memory 206 may be implemented in various data storage devices (e.g., Random-Access Memory (RAM)) having a faster access speed compared to the secondary memory 208. The faster access speed of the primary memory 206 allows the network monitor 104 to analyze ASI data sets and generate situation records approximately every hour.

The secondary memory 208 may be a secondary storage device for storing, among others, the processed ASI data sets and the generated situation records. The secondary memory 208 may be embodied, for example, as a solid-state drive, hard disk or other memory devices capable of storing a large amount of data compared to the primary memory 206.

The network interface 210 may include a NIC (network interface card) or other standard network interfaces to receive ASI data sets from the network monitor 104, and to communicate with other network interface devices coupled to the network 110. For example, the network interface 210 may be an Ethernet interface, a WiFi (IEEE 802.11) interface, or other types of wired or wireless network interfaces. In one embodiment, two or more network interfaces are used to communicate with different types of networks or perform specialized functions.

In one embodiment, the network interface 210 sends the ASI data sets directly to the situation analyzing engine 214.

The network interface 210 may send one data set of ASI data to the situation analyzing engine 214 for processing the ASI data and another ASI data set for storing in the secondary memory 208. Alternatively, the network interface 210 may send the ASI data to the situation analyzing engine 214 and not to the secondary memory 208. That is, the situation analyzing engine 214 receives the ASI data sets from the network interface 210, generates the situation records, and sends the ASI data sets to the secondary memory 208. By receiving the ASI data directly from the network interface 210, the situation analyzing engine 214 can process the ASI data at a high speed without delays associated with accessing the secondary memory 208.

Although FIG. 2 describes the manager 102 as including the situation analyzing engine 214, the network monitor 104 may also include the situation analyzing engine 214 or respective components of the situation analyzing engine 214 to process ASI data received at the manager 102. In one embodiment, the network monitor 104 and the manager 102 both include the situation analyzing engine 214.

Figure 3:
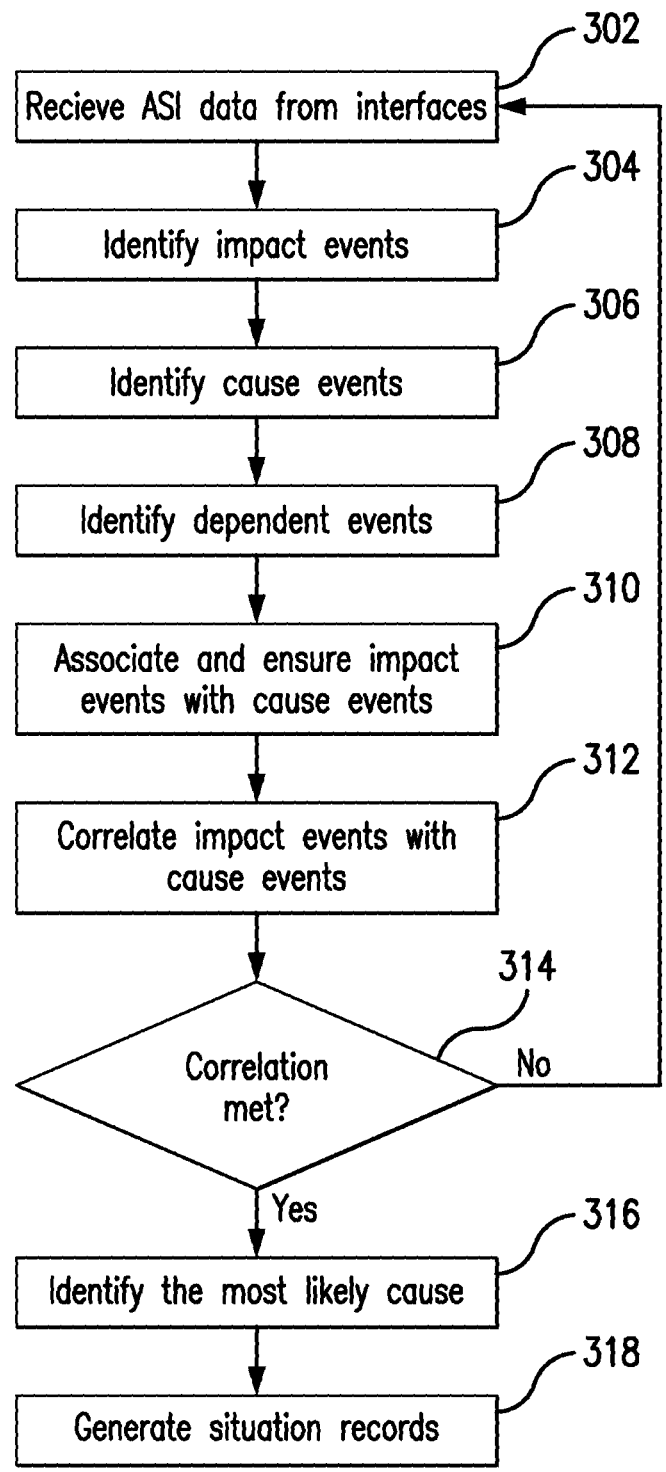
FIG. 3 is a flowchart illustrating a method for performing root cause analysis of failures in a telecommunication network in accordance with illustrative embodiments of the present invention.

FIG. 3 is a flowchart illustrating a method for performing root cause analysis of failures in a telecommunication network in accordance with illustrative embodiments of the present invention. Before turning to the description of FIG. 3, it is noted that the flow diagrams shown therein are described, by way of example, with reference to components shown in FIGS. 1 and 2, although these operational steps may be carried out in any system and are not limited to the scenario shown in the aforementioned figure. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 302, the situation analyzing engine 214 receives ASI data from the network interface 210. It should be noted that more than one network interface 210 can be used to receive ASI data. As noted above, the ASI data set provides performance metadata with analysis granularity required to extract rich network, service- and user-related metrics on devices, subscribers, base station ID, VLAN, etc. A received data set may be labeled with a time period. In one embodiment, the received data set may correspond to a one hour time period. The ASI data set may include, among others, metrics (captured by the network monitors 104) of various types related to various network nodes. Such metric ASI data may be sampled by the situation analyzing engine 214 at certain time intervals. These samples may be taken, for example, at five twelve minute intervals. Each data set may contain information about some metric, e.g. web server load or purchase orders placed, at the sample time that the data set is captured.

According to an embodiment of the present invention, an "event" of interest occurs when the value of an event-related metric exceeds a baseline or threshold for a x number of intervals in an hour. As described below, the situation analyzing engine 214 dynamically partitions all events into at least two categories—"impact" events and "cause" events. Impact metrics comprise any one of user experience measurements. Impact events occur on impact metrics As described below, cause event metrics influence the impact events. As further described below, certain dependent events, are cause events that contribute to the impact events. In other words, to generate a situation record, the situation analyzing engine 214 first receives and analyzes at least one data stream (data set) to detect a plurality of impact and cause events in the received data stream. It should be noted that the detected events occur in relation with a network entity referred to hereinafter as a "key". Each ASI data set includes at least one attribute indicative of an identity of the key. Once the impact event is detected by the situation analyzing engine 214, it is correlated with a plurality of detected cause events to determine if a relationship between the impact event and at least one of the cause events is found. In various embodiments, a plurality of predefined keys may include servers, applications, locations (sites, VLANs, etc.)

Accordingly, at step 304, the situation analyzing engine 214 identifies one or more impact events in the received data set based on an analysis of a plurality of corresponding metric values for each impact event. In one embodiment the plurality of metric values include, but are not limited to, elapsed response time, failure rate, timeout values, relative degradation of mean opinion score (MOS), call set-up failures, and the like associated with a predefined key. The elapsed response time metric may represent, for example, amount of time taken to render User Interface. Failure rate is the frequency with which a network node, component or an application fails, expressed, for example, in percentage of failures with respect to a number of transactions. Timeout values, latency values, or other similar values, may be used as metrics relating to network/application coverage level. At least in some embodiments, if data transmitted over the network 110 includes media content data items, the situation analyzing engine 214 may monitor a quality level indicator, with the explicit indication corresponding to a perceptual playback quality metric such as MOS or other well-known media quality metrics. If data transmitted over the network 110 includes voice over IP data, the situation analyzing engine 214 may evaluate a percentage of unsuccessful call setup attempts associated with the predefined key.

Next, at step 306, the situation analyzing engine 214 identifies one or more cause events in the received data set based on an analysis of a plurality of corresponding cause metric values for each impact event. In one embodiment the plurality of metric values may include one or more predetermined system load metrics, such as a total number of individual transactions and a total number of user sessions (number of users logged in the system at a given time). Other cause metrics may include, but are not limited to, performance metrics, such as a TCP Window size metric along with a count of TCP zero windows, rate of retransmitted packets, server bit rate, total number of successful call setup transactions, and the like. In some embodiments, the ASI data set may include a dynamically computed metric associated with packet retransmission requests. At least in some embodiments, if data transmitted over the network 110 includes media content data items, the situation analyzing engine 214 may analyze audio/video packets received during a time interval t to determine network jitter dynamics data and conversational interactivity data. The network jitter dynamics data may provide an indication of jitter in a network that relays the audio/video data packets. If data transmitted over the network 110 includes voice over IP data, the situation analyzing engine 214 may evaluate a percentage of successful call setup attempts associated with the predefined key.

It should be understood that generally problems with any particular application (where the application is one of the keys) may occur because of service enabler applications' issues. For instance, communication over the network 110 may be facilitated by an active directory module, which may include DNS, DHCP, LDAP, Sub-Nets and IP Management resources. As a specific example, Oracle database server may appear to have a slow response time when in reality the DNS server it is communicating to is performing poorly causing the issue. In other words, in this example, performance of the Oracle database server depends on the performance of the DNS server it is in communication with. Various embodiments of the present invention consider this dependency between the Oracle server and the DNS server as a dependent situation. In this example, the slow Oracle server response time represents the impact event and the slow DNS server response time represents the cause event due to dependency (dependent event in short). In other words, the Oracle server has a dependency on the DNS server. According to an embodiment of the present invention, at step 308, the situation analyzing engine 214 identifies one or more dependent events.

At step 310, the situation analyzing engine 214 may be configured to associate these impact events with the cause events (step 310). In one embodiment, a set of static rules may be utilized by the situation analyzing engine 214 to perform the association. Table 1 below shows an example set of association rules that can be used in some embodiments of the invention.

the total number of new sessions, server's bitrate, utilization, server's TCP minimum window, server's TCP Zero Window and total number of transactions that may correspond to the percentage of timeouts impact metric. Furthermore, the rules listed in Table 1 associate the dependent cause metrics with the corresponding impact metrics. As a non-limiting example, the rules may associate percentage of timeouts impact metric with dependent cause metrics indicative of average response time, timeout percentage and total number of occurrences of the server being down. In other words, by applying the association rules to the set of a plurality of predefined metrics, relationships can be identified between the impact metrics and potentially some dependent cause metrics. In summary, Table 1 conceptually shows how association rules can be used to cross-associate a set of impact metrics for a particular key to a set of cause metrics to generate situation records described below.

According to an embodiment of the present invention, step 310 may further involve ensuring situations by remov-

TABLE 1

| Impact Metric | Cause Metric | Dependent Cause metric |
|---|---|---|
| failureRate | totalTransactions | |
| | serverTCPZeroWindow | |
| | serverTCPMinWindow | |
| | newSessions | |
| | retransPct | |
| timeoutPct | newSessions | averageResponseTime |
| | serverBitRate | TimeoutPct |
| | Utilization | serverDown |
| | serverTCPMinWindow | |
| | serverTCPZeroWindow | |
| | totalTransactions | |
| | retransPct | |
| averageResponseTime | totalTransactions | averageResponseTime |
| | serverTCPZeroWindow | timeoutPct |
| | serverTCPMinWindow | serverDown |
| | retransPct | |
| | newSessions | |
| | serverBitRate | |
| | Utilization | |
| ingressPCTproblemMOS | ingressPCTproblemPacketLoss | |
| | ingressPCTproblemJitter | |
| ingressDegradedMOS | ingressPCTproblemPacketLoss | |
| | ingressPCTproblemJitter | |
| failedRegistrationPct | successfulRegistrationTransactions | averageResponseTime |
| | serverBitRate | timeoutPct |
| | | serverDown |
| averageRegistrationResponseTime | successfulRegistrationTransactions | averageResponseTime |
| | serverBitRate | timeoutPct |
| | | serverDown |
| callSetupTimeoutPct | successfulCallSetupTransactions | averageResponseTime |
| | serverBitRate | timeoutPct |
| | | serverDown |
| averageCallSetupResponseTime | successfulCallSetupTransactions | averageResponseTime |
| | serverBitRate | timeoutPct |
| | | serverDown |
| averageCallTeardownResponseTime | successfulCallTeardownTransactions | averageResponseTime |
| | serverBitRate | timeoutPct |
| | | serverDown |
| callTeardownTimeoutPct | successfulCallTeardownTransactions | averageResponseTime |
| | serverBitRate | timeoutPct |
| | | serverDown |
| shortCalls | | |
| serverDown | | |

In some embodiments, a library of standard association rules listed in Table 1 are provided, which are modifiable to vary certain of the cause/impact metrics. For example, the situation analyzing engine 214 may use rules listed in Table 1 to identify relationships between impact metrics indicative of percentage of timeouts and cause metrics associated with ing false positives. False positives particularly may arise when cause events are not properly aligned with impact events in time. In one embodiment, as part of false positive testing, the situation analyzing engine 214 may evaluate the percentage of time when a particular set of cause events and a corresponding impact event co-occur over the number any of the events occur. More specifically, the situation analyzing engine 214, for example, may analyze the ASI data set received in step 302 to determine whether within the analyzed time period (e.g., one hour), the cause event occurred every single time at approximately the same time the impact event occurred and vice versa. In one embodiment, the situation analyzing engine 214 considers these events aligned when a matching percentage exceeds a predefined threshold.

Once the situation analyzing engine 214 ensures proper alignment, at step 312, the situation analyzing engine 214 correlates impact events with the cause events. In one embodiment, the situation analyzing engine 214 may run one or more tests to identify which of the cause events most likely contributed, at least partially, to the occurrence of corresponding impact events. For example, if the situation analyzing engine 214 detects a complete (100%) alignment between an impact event and one or more cause events, then the cause events are included in the pool of candidate events and the situation analyzing engine 214 does not analyze any further rules.

According to an embodiment of the present invention, if the situation analyzing engine 214 does not detect complete alignment, step 312 may further involve calculation of an alignment ratio between the cause and impact events (this ratio is the same as the ratio in step 310). In one embodiment, this ratio may be computed by the situation analyzing engine 214 as the number of analyzed time intervals that are common between the cause and impact events over the number of analyzed time intervals covered by either of the events. If the alignment ratio is less than a predetermined threshold, the situation analyzing engine 214 may discard the cause event. If the ratio is larger than the predetermined threshold, then the situation analyzing engine 214 may apply a next rule described below.

According to an embodiment of the present invention, if the ratio between the cause and impact events is larger than the predetermined threshold, the situation analyzing engine 214 may determine the cause events that have a strong correlation or inverse correlation with the impact events. By sending the cause-effect relationship between distinct cause events and impact events to the situation analyzing engine 214, the situation analyzing engine 214 can generate a situation record indicative of what events led up to a specific problem within the key. Accordingly, a system or network administrator may quickly receive an indication of one or more most likely scenarios that may have led to a specific system situation. This can allow the administrator to rapidly take educated action toward system repairs or loss/failure mitigation. At least in one embodiment, the correlation needs to be a statistically significant linear correlation between the cause events and an impact event as well as having low p-values. For example, the p-value lower than 0.05 implies that the correlation test is statistically significant and 95% of the time properly constructed time intervals should contain the true value of the variable of interest (in this case both cause and impact events). It should be noted that to perform the correlation, the situation analyzing engine 214 utilizes time marked (time stamped) intervals around the two events.

Referring back to FIG. 3, at step 314, the situation analyzing engine 214 may determine whether at least one correlation criteria has been met based on the correlation results. For example, the situation analyzing engine 214 determines whether there is a strong correlation or inverse correlation and the p-value is less than or equal to 0.05. In response to determining that none of the correlation criteria has been met (decision block 314, "No" branch), the situation analyzing engine 314 may return back to step 302 and receive a next ASI data set to analyze. If at least one correlation criteria is met (decision block 314, "Yes" branch), at step 316, the situation analyzing engine 214 identifies the most likely cause.

In one embodiment, at step 316, the situation analyzing engine 214 selects, from the candidate pool of cause events, one or more best likely explanations for the impact. These cause events in the candidate pool may be sorted from a highest priority to a lowest priority based on domain knowledge. In this way, the situation analyzing engine 214 can evaluate candidate cause events in a more efficient order, starting with the candidates with the highest priority and working towards the lower priority candidates. For example, if the candidate pool includes the newSession and totalTransactions cause events, then the situation analyzing engine 214 gives the priority to newSessions. In one embodiment, a correlation cause metric list ranked by priority may include:

ingressPCTproblemJitter
    ingressPCTproblemPacketLoss
    successfulRegistrationTransactions
    successfulCallSetupTransactions
    succesfulCallTeardownTransactions
    All dependency metrics
    newSessions
    totalTransactions
    serverRetransPct
    serverTCPZeroWindow
    serverTCPMinWindow
    outServerBitRate
    inServerBitRate
    Utilization According to an embodiment of the present invention, if a particular key (e.g., an application server) is associated with multiple impact events having impact relationships with one or more cause events, the situation analyzing engine 214 may process and present to a user only the most important impact events. Hence, in various embodiments, step 316 may further include the situation analyzing engine 214 determining the priority order of the identified impact events based on the pre-existing domain knowledge (e.g., known event-based patterns). This pre-existing domain knowledge, in various embodiments, can be pre-identified by manual methods performed by subject matter experts or individuals with domain expertise using GUI interface, for example.

In one embodiment, a correlation impact metric sample ranked by priority may include:

averageRegistrationResponseTime
    failedRegistrationPct
    registrationTimeoutPct
    averageCallSetupResponseTime
    failedCallSetupPct
    callSetupTimeoutPct
    averageCallTeardownResponseTime
    failedCallTeardownPct
    callTeardownTimeoutPct
    averageResponseTime
    failureRate
    timeoutPct
    ingressDegradedMOS
    ingressPCTproblemMOS In the exemplary embodiments above the situation analyzing engine 214 focuses on metrics related to server performance, dependent applications performance, link performance and TCP performance aspects. However many of the application level performance issues on a server originate from server infrastructure level issues, such as, but not limited to issues related to CPU, memory and disk availability, etc., for critical application processes running on the server. Thus, in yet another embodiment, the situation analyzing engine 214 can leverage application server infrastructure related metrics as additional cause metrics in step 316.

More specifically, the infrastructure related metrics may include one or more of the following: uptime/availability, CPU utilization, memory utilization, disk capacity and I/O, network I/O and the like. Uptime is the amount of time that a server has stayed up and running properly. It reflects the reliability and availability of the server. CPU utilization is the amount of CPU time used by the various applications running on the server while processing requests. Memory utilization refers to the amount of memory used by applications running on the server while processing a request. Server disk space/capacity is a critical resource that is typically closely watched to prevent potential server down time and failures. Application processes might fail due to an inability to allocate disk space. In addition, low disk space might make it impossible for page file to grow to support virtual memory and causes application performance to suffer. Network I/O provides information on bytes and packets read/write per second and overall network utilization on every network interface running on the server. It helps identify whether a distributed application running on a server is saturating the network. If there is huge number of bytes read and written from the network but the network utilization never reaches much above certain baseline, it can be concluded the applications running on this system are not experiencing a performance issue as a result of a saturated network.

Next, at step 318, the situation analyzing engine 214 generates one or more situation records based on the correlation results. As noted above, each situation record describes the context of the relationship between impacted metrics and causal metrics. This context may include at least the identified most likely cause. In various embodiments, step 318 further includes the situation analyzing engine 214 presenting the generated situation records to a user.

FIG. 4 is an exemplary situation record generated by the method of FIG. 3 in accordance with an illustrative embodiment of the present invention. In this embodiment, the situation analyzing engine 214 may present the generated situation record to a user (i.e., network administrator). The interactive user interface may enable a user to navigate and analyze the generated record by examining various facets of the situation record data. As shown in FIG. 4, the situation records data 400 may be presented in a tabular form. Each row of presented data 400 may have a situation record relating to a device, service, application, or other monitored key. The row may have several data parameters that may include any type of data in any format. In many cases, numerical, categorical, or text data may be used.

In the embodiment illustrated in FIG. 4, the situation record has the following data parameters associated therewith: Id (identification) of the situation 402, approximate Start Time of the situation 404, approximate End Time of the situation 406, Description of the situation 408, Duration of the situation 410, Interface associated with the situation 412, Application associated with the situation 414 and Server associated with the situation 416. It should be noted that the start and end time parameters in each row define the period of time for which the situation record is valid. When a new situation record is generated by the situation analyzing engine 214, the start time 404 contains the time the new situation was first detected and the end time of the situation 406 record is set to the time the new situation was last observed (or current system time). The description 408 contains more detailed description of the situation (e.g., information related to the cause and event metrics and the changes these metrics observed from their threshold or baseline values) and the interface parameter 412 identifies an interface where the cause metric was observed. The application 414 and the server 416 data parameters identify the application and server, respectively associated with the generated situation record. For example, if session failures are increasing on an Oracle database server, the situation analyzing engine 214 could report a situation such as: "New Sessions affecting Failure Rate on an Oracle Server." In this case, the New Sessions represents a cause event, while, the Failure Rate represents an impact event. As noted above, an event of interest occurs when the value of an event-related metric exceeds a baseline threshold.

Figure 5A:
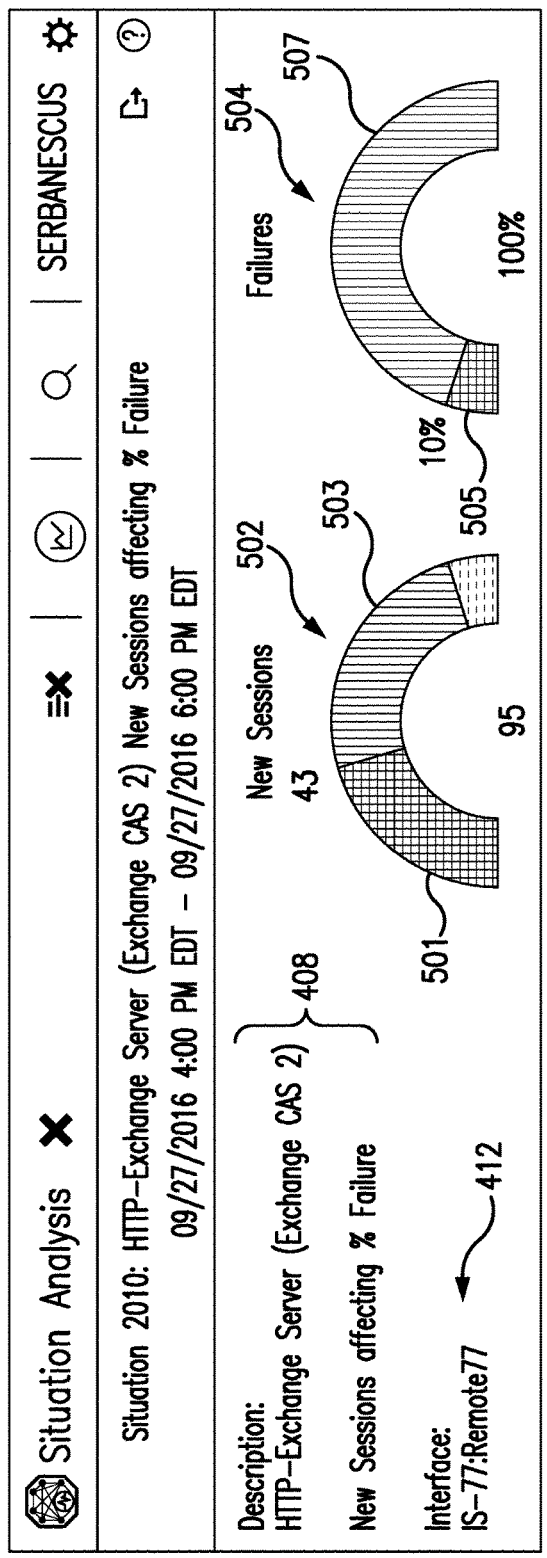
FIGS. 5A-5D illustrate graphical rendering of the generated situation records for display on a user interface in accordance with an illustrative embodiment of the present invention.
Figure 5B:
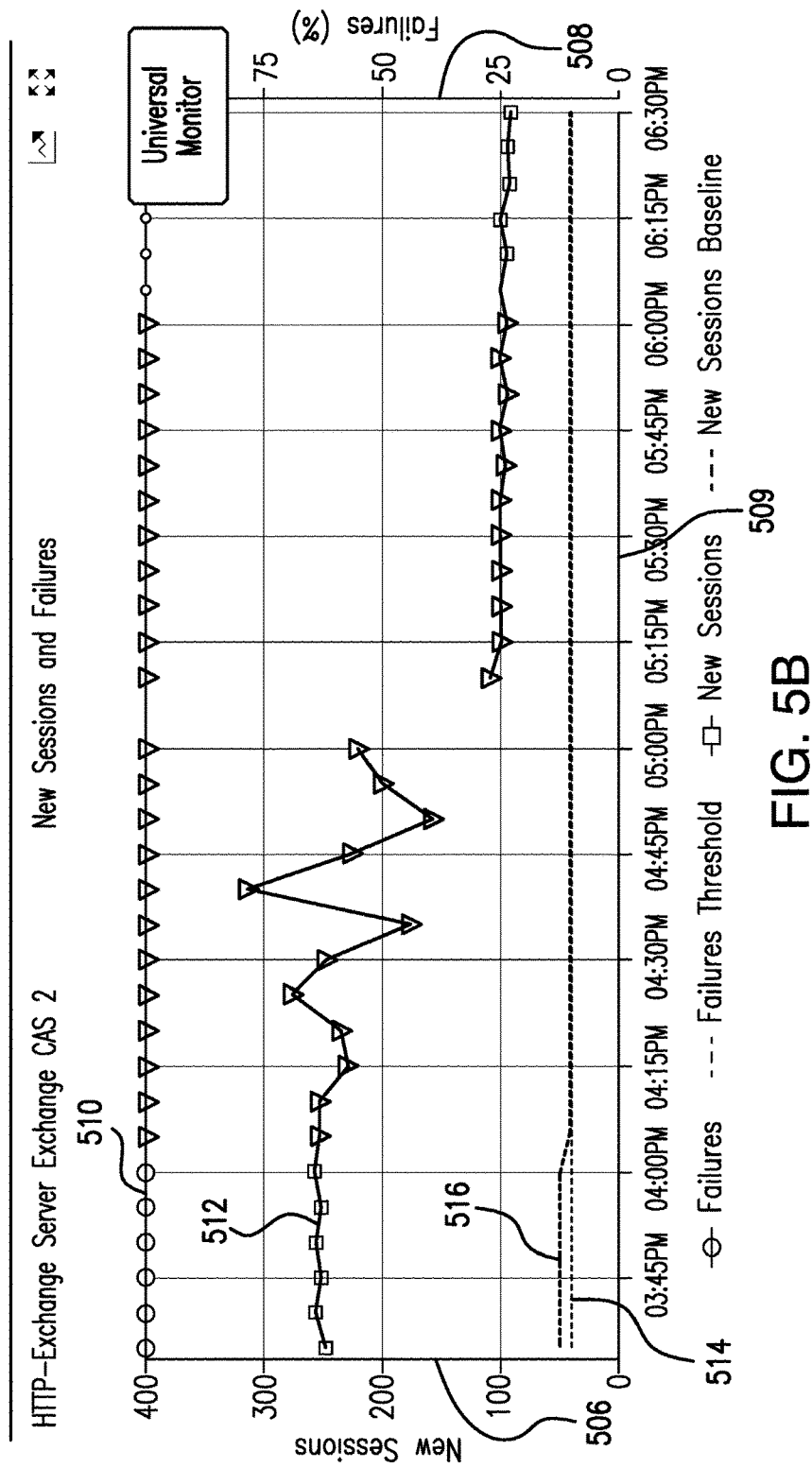
Figure 5C:
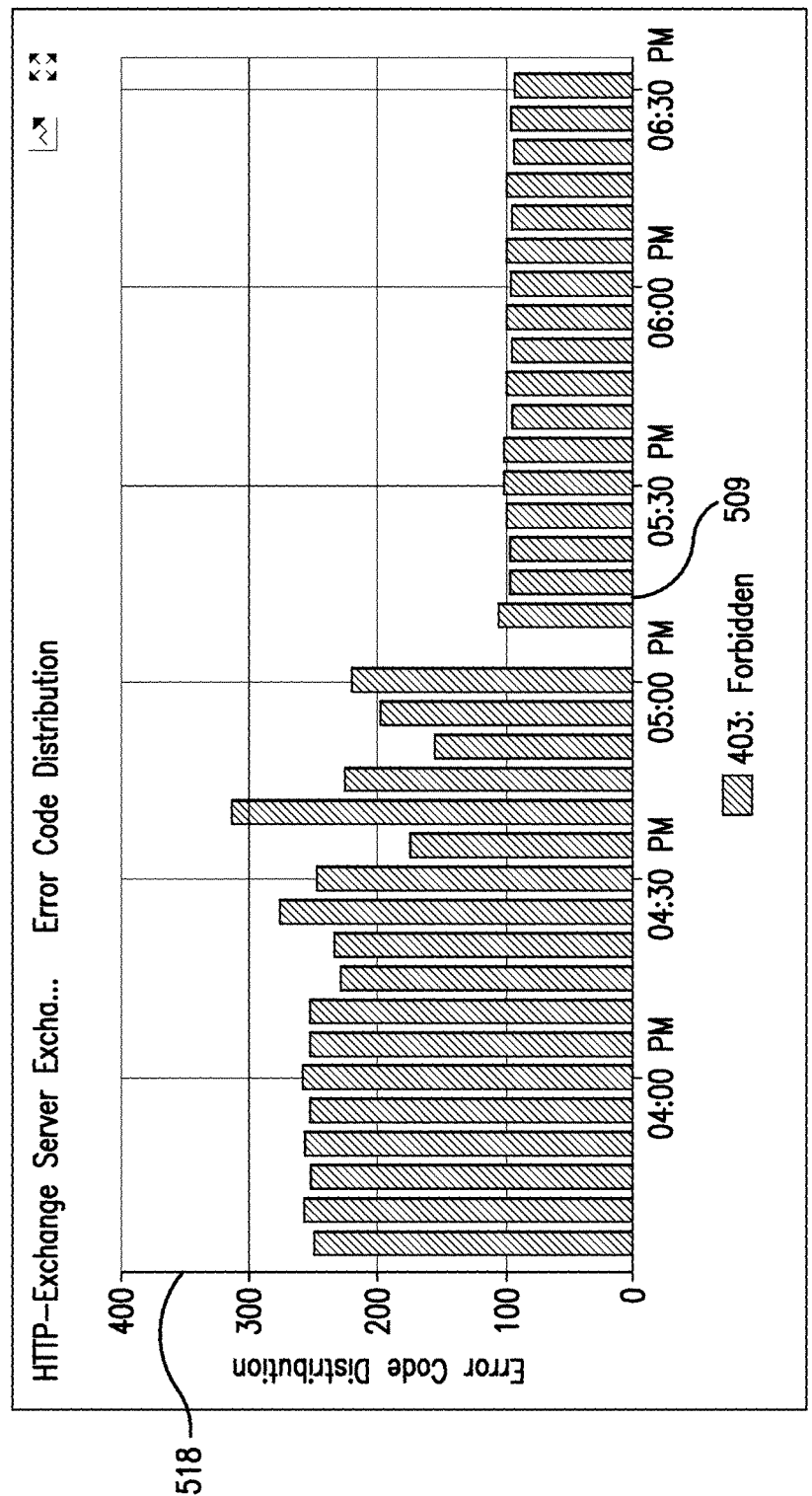
Figure 5D:
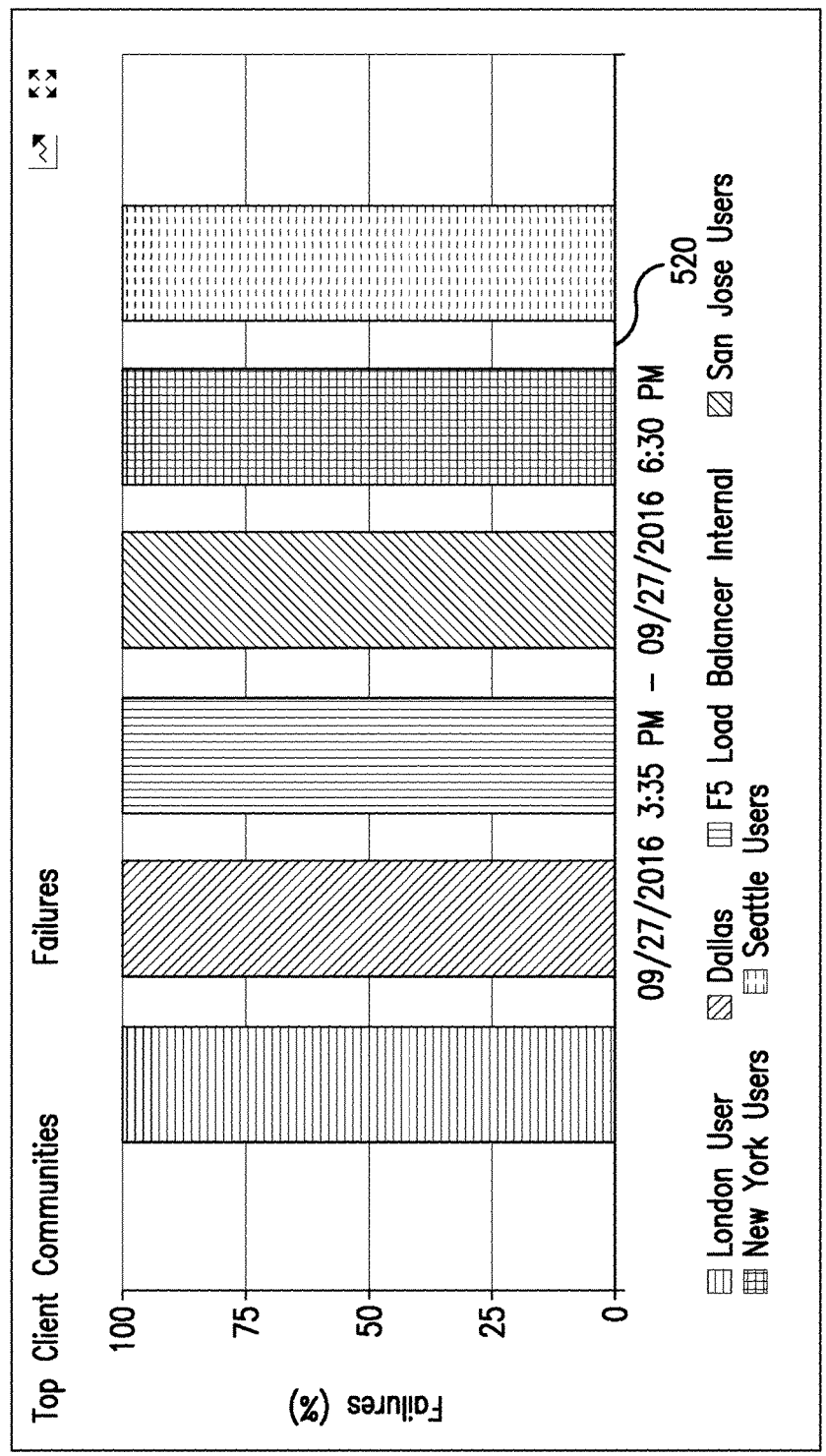

FIGS. 5A-5D illustrate graphical rendering of the generated situation records for display on a user interface in accordance with an illustrative embodiment of the present invention. More specifically, FIGS. 5A-5D illustrate an example corresponding to the situation record 418 in FIG. 4 in which an increase in new sessions is causing failures to rise on an HTTP server to 100%. FIG. 5A illustrates the correlation between the new sessions and failures metrics each represented by respective horseshoe-shaped segments 502 and 504. FIG. 5A further includes the detailed description of the situation 408 and the interface 412 associated with the situation. In FIG. 5A, the shaded regions 501-507 shows the relationship between the cause and impact metrics. Regions 501 and 505 illustrate the threshold values for the new session and failures metrics, respectively, while regions 503 and 507 illustrate the increase for the respective metrics. FIG. 5B illustrates graphs representing values of an impact event metric and respective cause event metric identified based on the violation of corresponding thresholds. In FIG. 5B, a first vertical axis 506 represents the number of new sessions, a second vertical axis 508 represents the percentage of server failures and the horizontal axis 509 represents the analyzed time period. In this case, the analyzed time period is approximately equal to the duration 410 of the situation. Furthermore, in FIG. 5B a first graph 510 representing failures is shown with respect to its pre-defined baseline threshold 514 and a correlated second graph 512 representing new sessions is shown with respect to its own pre-defined baseline threshold 516. As shown in FIG. 5B, both the number of new sessions and the number of failures substantially exceed corresponding thresholds. FIG. 5C identifies the specific failures associated with the situation record 418. In this exemplary case, the specific errors occurring on the affected HTTP Exchange server are HTTP "403 Forbidden" errors. In FIG. 5C, the vertical axis 518 represents error code distributions and the horizontal axis 509 represents the analyzed time period. FIG. 5D illustrates the client communities 520 affected by the situation represented by the situation record 418. These client communities 520 represent the top clients based on the impact metric for the application server associated with the impact event.

It should be noted, that the situation analyzing engine 214 may aggregate data values associated with a particular key (e.g., a server) for each time interval through multiple instrumentation points monitored by the network monitor 104. However, the situation analyzing engine 214 is configured to identify the most accurate and reliable source of data regarding the analyzed situation. In one embodiment, to identify the most accurate data source the situation analyzing engine 214 may utilize the interface that observed the highest number of transactions. In at least some embodiments, the situation analyzing engine 214 may continue monitoring metrics associated with the generated situation record, if the most likely cause persists.

Advantageously, the various embodiments described herein provide automated techniques for troubleshooting failures in a computer network. The aforementioned embodiments apply the association rules to the set of a plurality of predefined metrics provided by the ASI data set to identify links between the impact metrics/cause metrics and potentially some dependent cause metrics. The ASI data set comprises highly scalable metadata that enables a comprehensive real-time and historic view of service, network, application, and server performance. Furthermore, the automated system disclosed herein is preferably configured to provide a ranked list of the most likely causes of one or more network failures based on correlated information.

Figure 6:
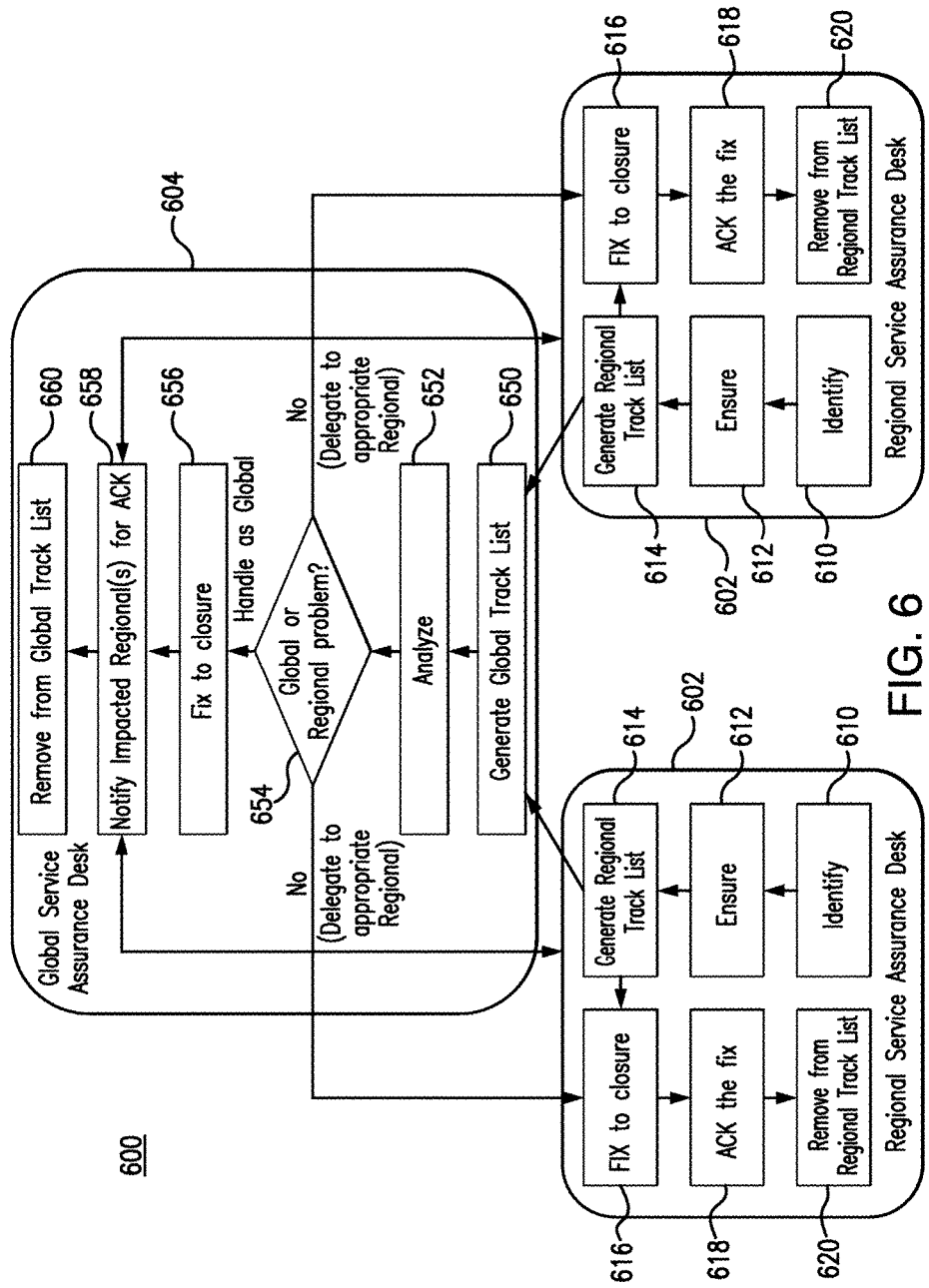
FIG. 6 is a flow diagram illustrating exemplary methods performed by distributed regional servers and a global server for resolving and tracking resolution of serious problems detected by the regional servers.

With reference to FIG. 6, a flow diagram of an example embodiment of a distributed service assurance network 600 is shown. Before turning to description of FIG. 6, it is noted that the flow diagram shown therein is described, by way of example, with reference to components shown in FIGS. 1 and 2, although these operational steps may be carried out in any system and are not limited to the scenario shown in the aforementioned figure. Additionally, the flow diagram in FIG. 6 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step or performed in parallel. In some embodiments, one or more additional steps may be included.

A plurality of regional service assurance desks (RSADs) 602 communicate with a global service assurance desks (GSAD) 604. Each of the RSADs 602 operates in a regional area to monitor and provide regional service assurance to a regional network or group of networks by identifying problems and ensuring whether a problem serious, such as determining if it is persistent or trending worse. The RSADs 602 enter ensured problems on a track list. The GSAD 604 receives track list entries from the RSADs 602. If the GSAD 604 determines that a track list entry received from one of the RSADs 602 is not related to other RSADs 602 or track list entries received from other RSADs 602, the GSAD 604 informs the RSAD 602 that reported the track list entry to resolve the problem. If the GSAD 604 determines that there is a correlation between a track list entry reported by one RSAD 602 and a potential cause indicated by a track list entry reported by a different RSAD 604, the GSAD 604 then decides to manage resolution of the problem. The RSADs 602 thus are operating independently of one another, and can be performing any of steps 610-620 at any time.

Each RSAD 602 can be similar to network system 100 shown in FIG. 1 that monitors one or more networks 110. The RSAD 602 identifies an occurrence that indicates unusual network behavior and a potential problem and enters the problem on a watch list; ensures that problems entered on the watch list are persistent (e.g., not transient) or trending worse and enters these problems on a track list; actively tracks problems that have been ensured, including classifying and reporting entries added to the track list e.g., to the global GSAD 604 and/or a user; analyses problems entered on the track list at the regional level to make inferences between different problems, such as determining a situation in which cause and impact events are correlated, and generates a description (e.g., a natural language description) that describes the inferences using supporting data from the watch list; receives information from the GSAD 604 about situations that include correlations based on events entered on track lists from one or more other RSADs 602; tracks the situations included on the track list and/or received from the GSAD 604, including tracking impact events as identified cause events are resolved (e.g., incrementally) until reaching a conclusion, such as the problem being resolved; and removes the problem from the track list after the conclusion is reached.

The GSAD 604 is a server having a computer system that receives and processes track list entries from a plurality of RSADs 602, forming a global track list. The GSAD 604 transmits messages to the RSADs 602 based on a determination whether a received track list entry needs to be analysed and handled locally by the RSAD 602 or manages the track list entry, such as by correlating entries from track lists of different RSADs 602 and instructing the RSADs 602 regarding resolving or tracking the problem as it is being resolved. The GSAD 604 removes entries from the global track list once they have come to a conclusion, e.g., are resolved.

Steps 610-620 are described with reference to a single RSAD 602, but the description applies to each of the RSADs 602. At step 610, the RSAD 602 identifies a regional occurrence that is unusual and indicates a potential problem, such as by detecting that an observed KPI measurement has exceeded (including being above or below) a predetermined threshold limit. An identified problem is entered on a watch list. The watch list can include, for each entry, observed KPI measurements (e.g., at an interface, application, or serve level), and a status classification (e.g., elevated, high, severe).

The KPI measures used for determining the watch list can be selected, for example, based on network behavior learning and customer specific deployment scenarios. Each KPI measure can be assigned a measure type, designated as an impact or cause event. Designation as an impact or cause event can be automatically assigned (e.g., by the situation analyzing engine 214) or assigned by the regional network administrator. The observed KPI measurements can be included in the ASI data, for example.

The status classification can be determined based on a comparison of one or more KPI measures to one or more threshold conditions. Threshold conditions can include, for example, and without limitation, a number of times (e.g., samples) or a duration of time for which an observed KPI measurement or a change in an observed KPI measurement exceeded a threshold value, an amount by which a threshold value was exceeded, and an observed KPI measurement reaching within Y % of a threshold value.

The KPI measures and threshold conditions applied can be individually weighted or weighted based on combinations of KPI measures and threshold conditions involved. The weights can be relative weights (e.g., 0.0-1.0) based on importance as an indicator of an anomaly and impact.

The weights can be selected to heavily weight KPI measures that influence a priority property, such as user experience or efficiency. In an example in which the main priority is user experience, weights that impact user experience are set to be high. Table 1 below shows relative weight settings for different KPI measures, in which a measure type of user experience is emphasized.

TABLE 1

| KPI Measure | Relative Weight | Measure Type |
| --- | --- | --- |
| Transaction Rate | 0.5 | Cause |
| Failure Rate | 1.0 | UXI |
| Avg. Response Time | 1.0 | UXI |
| Server Zero Window | 0.25 | Cause |
| Server Reducing Window Size | 0.25 | Cause |

These weights can be used to determine the status classification. For example, when a threshold condition involving more a heavily weighted combination of different KPI measures develops or the condition deteriorates, the status classification can be escalated to a higher level more quickly than if a threshold condition developed with a lightly weighted combination. The weights can be received. Receiving data can include via user entry or from another software module or device; reading, accessing, or retrieving, e.g., from storage, such as a look-up table; receiving as a transmission, or otherwise obtaining.

Step 610 can further include calculating an anomaly index (AI) using weights associated with the KPI measures. The anomaly index can be calculated for each sample (for example, for samples obtained each five minutes) using the below Equation (1).

Equation (1):

$$AI \text{ (Anomaly Index)} = \Sigma(\text{Relative weighted } KPI \text{ measures exceeding threshold or baseline values})$$

The AI can be used to determine whether to store the entry on the watch list or disregard the watch list. When AI≥1.0, it is implicitly indicated that user experience is impacted, and hence an entry should be entered in the watch list for monitoring. When AI<1, it would be can be deemed to not be an anomaly without storing it to the watch list.

The watch list can be updated at regular intervals (e.g., for each five minute sample). Logic and keywords for determining threshold conditions and classification can be configurable.

At step 612, the RSAD 602 ensures that the potential problem is serious and not transient. Otherwise, if the problem is not ensured it is set aside or ignored, without adding it to a regional track list at the next step. An example of a persistent problem is a threshold condition that persists for a predetermined amount of time, such as N 5-min samples and/or that is trending worse, e.g., increasing by X % or getting progressively closer to a predetermined threshold, in subsequent samples or sets of samples, wherein these changes are a worsening, as they indicate a degradation of at least one network condition. The threshold conditions determined at step 610 can be used to determine threshold persistence. Step 612 can be performed at regular intervals, such as after X iterations of step 610. For example, step 612 can be performed to ensure a problem using each set of twelve samples, the samples being acquired every five minutes.

A description of an example process of ensuring that a problem is serious is described further below with respect to FIG. 10.

When problems are ensured before being added to a regional track list, the regional track list has been vetted to include serious problems that need attention. Accordingly, computing resources are devoted to serious problems. These serious problems are brought to the attention of network administrators Network administrators need to react quickly to large amounts of information. When the network problems are ensured, the serious problems are not clouded by less serious problems or noise. The network administrators are presented with focused information about actionable serious problems.

At step 614, a problem that has been ensured is added as an entry to the regional track list. Furthermore, at step 614 the regional track list, or a new entry on the regional track list, is forwarded to the GSAD 604. In embodiments, the regional track list or a new entry on the regional track list is processed at operation 616 in addition to, or instead of, being forwarded to the GSAD 604. The entries on the regional track list can be impact events or cause events, as described above.

Entries included on the regional track list can be reported to a regional network administrator. The conditions that caused the entry to be included on the regional track list can be displayed to the regional network administrator, e.g., in natural language or graphically. Example information that can be reported and displayed to the regional network administrator includes observed KPI measurements, threshold values applied, weights applied, reporting scenarios, and classifications determined. The reporting scenarios include logic applied to threshold conditions that were determined and caused the entry to be included in the regional track list. An example of a reporting scenario displayed can be "(Rising for: 5 mini-samples && Risen by: 10%)||(Within 10% of upper threshold)"; "Response time risen by 15% in 4 samples, with simultaneous rise pattern observed in transaction rate"; "Failure rate risen by 20% in 8 samples, with simultaneous rise pattern observed in transaction rate".

A GUI can display regional track list entries, including categories and/or numbers of entries (e.g., total and/or per category). The categories can be color-coded and summarized in a particular area (e.g., at the top of a display screen). For example, color-coded rolling tickers can be displayed in an upper corner of the display screen for each respective category, wherein a regularly updated number in the ticker indicates the number of regional track entries to which that category is assigned, thus representing a number of instances that an associated problem was detected. Regional rack entries can be displayed as icons that can be clicked for accessing additional information about that entry.

At step 650, the GSAD 650 is provided with the regional track list or new entry from the RSAD 602, as well as receiving other regional track list entries from other RSADs 602. Provision of regional track lists, or entries on the regional track lists, by the RSADs 602 to the GSAD 604 can be via transmissions by the RSADs 602, such as in response to adding one or more new events (e.g., a threshold amount of events) to a track list, at regular time intervals or in response to a request by a user or the GSAD 604. In embodiments, the GSAD 604 can retrieve regional track list information (e.g., a regional track list or one or more entries on a regional track list) from an RSAD 602. The GSAD 604 further forms a global track list that includes regional track lists or entries from regional track lists provided by one or more of the different RSADs 602.

At step 652, the GSAD 604 analyzes entries included in the global track list, which can include correlating different entries. The analysis can include one or more operations performed by the situation analyzing engine 214 and/or the correlator 106 described above. The correlator 106 makes correlations between impact events and cause events included in the global track list. Correlated impact events and cause events can be from the same RSAD 602 or different RSADs 602.

Information about the correlations can be displayed by a GUI generated by the GSAD 604 (also referred to as a global GUI), e.g., graphically and/or in natural language. The global GUI can indicate which components, e.g., application servers from a particular region monitored by an RSAD 602, were impacted. Load distribution correlations and load balancing issues among regional networks monitored by the distributed RSADs 602 can be indicated in the display. The display can indicate impact or potential impact caused by problems identified in dependent servers of the regional networks that affect other regional servers. For example, an alert can be displayed in the global GUI in connection with an identified return time problem in a database server associated in a first region that can affect a web server in the first region or a different region, and can further affect user experience (UXI).

At step 654 the GSAD 604 determines if correlations that were made are for impact events and cause events provided by the same RSAD 602 or different RSAD 602. If the determination at step 654 is that the track list entries indicate a regional problem because the entries are for impact and cause events from the same RSAD 602 that were correlated, then the GSAD 604 notifies that RSAD 602, as indicated by the arrow from step 654 to the appropriate RSAD 602. Additionally, the GSAD 604 delegates to that RSAD 602 the task of handling the global track list entries that correspond to the correlated impact and cause events, and the method continues at step 616 in which the RSAD 602 takes charge of handling these task list entries.

At step 656, the GSAD 604 determines at least one source likely to be causing the correlated cause event and generates a message to fix the source(s) and resolve the cause event. The source(s) can include one or more hardware, software, and/or firmware components that are included in one or more identified RSADs 602 that provided a global track list entry determined to be included in the cause event. The message is generated for transmission to the one or more identified RSAD 602.

Additionally, at step 656, the GSAD 604 determines at least one component likely to be affected by the correlated impact event and generates a message to monitor the affected component(s) to determine if the problem is being resolved. The affected component(s) can include one or more hardware, software, and/or firmware components that are included in one or more identified RSADs 602 that provided a global track list entry determined to be included in the impact event. The message is generated for transmission to the one or more identified RSAD 602.

The problem can be iteratively resolved until closure, which can include verifying that the effect on the monitored component(s) affected by the correlated impact events improves with successive iterations until resolution. Resolution of the problem can include, for example, sufficient improvement of monitored components (e.g., as indicated by observed data and/or operator feedback from the one or more identified at RSADs 602), a timeout condition, or receipt of user input indicating that the problem is resolved. Although not shown, operations 656 and 658 can be performed iteratively until the problem is resolved.

At step 658, the GSAD 604 notifies each RSAD 602 that provided the global track list cause and impact entries that were correlated and requests an acknowledgement of receipt and feedback from the associated RSADs 602. The notification and requests for feedback are indicated by the arrow from step 658 to the RSAD 602, and the acknowledgements and feedback are indicated by the arrow from the RSAD 602 to step 658. The notification can include a request for feedback from each RSAD 602 determined to have reported a correlated cause or impact event to the GSAD 604. The feedback about fixing the correlated cause can acknowledge and describe each fix performed by the RSAD 602. The feedback about the correlated impact can describe monitoring results of the affected components and/or changes in the correlated impact event after fixing the source of the correlated cause event. The global GUI can display information for each global track list entry in the process of being resolved. The information displayed can indicate the fixes performed and the effect on the correlated impact events.

At operation 660, the GSAD 604 removes the global track list entries that were correlated and for which the associated problem was resolved. The global list entry can be removed when feedback from an RSAD 602 that reported the correlated impact event(s) indicates that the problem has been resolved, or in response to an affirmative global network administrator action.

Returning to operations performed by the RSAD 602, at step 616, if instructions were received regarding fixes that need to be made to resolve the problem or components affected by the problem that need to be monitored, the RSAD 602 performs tasks to carry out the fixes or monitoring.

If the RSAD 602 was notified at step 654 that the problem is a regional problem, and the cause event is identified, then at step 616 the RSAD 602 determines the source of the correlated cause event and carries out tasks directed at the source to resolve the problem, which can include verifying that the problem has been resolved by monitoring components affected by the correlated cause event.

If the RSAD 602 is executing step 616 based on processing entries of the regional task list generated at step 614, then the RSAD 602 analyzes entries in the regional task list, which can include determining cause and impact events by making correlations. The analysis performed at step 616 can include one or more operations performed by the situation analyzing engine 214 and/or the correlator 106 described above. The source of the cause events is determined and fixed, and components affected by the cause events are determined and monitored until resolution of the problem.

Information determined through the analysis can be displayed in a GUI provided by the RSAD 602 (a regional RSAD 602), e.g., graphically or in natural language. The regional GUI can indicate which components, e.g., application servers, were impacted. An example natural language description of an analysis result associated with a particular server is "The App server ABC has seen a rising trend of ZeroWindow with a corresponding rise in transaction rate. This has impacted its response time trend." Load distribution correlations and load balancing issues can be indicated in the display. The display can indicate impact or potential impact caused by problems identified in dependent servers that affect other servers. For example, an alert can be displayed in connection with an identified return time problem in a database server that can affect a web server an effect user experience (UXI). The watch list can provide information about correlations and aggregated information.

At step 618 the RSAD 602 sends an acknowledge message (ACK) to the GSAD 604 to indicate that the message sent by the GSAD 604 at operation 658 was received and the associated problem is being fixed and/or monitored. The RSAD 602 can apprise the GSAD 604 of results as it problem is being fixed and resolved. The regional network administrator can follow the regional track list entries. The GUI can display information for a track list entry being followed as the associated problem is being resolved. The information displayed can include updates to observed KPI measurements, reporting scenarios, and classifications, and an indication when the associated problem is satisfactorily resolved, e.g., its classification can change to "resolved."

At step 620, the RSAD 602 removes entries from the regional track list that were resolved at operation 616. The entry can be removed when its classification changes to resolved, or in response to an affirmative regional network administrator action.

Figure 7:
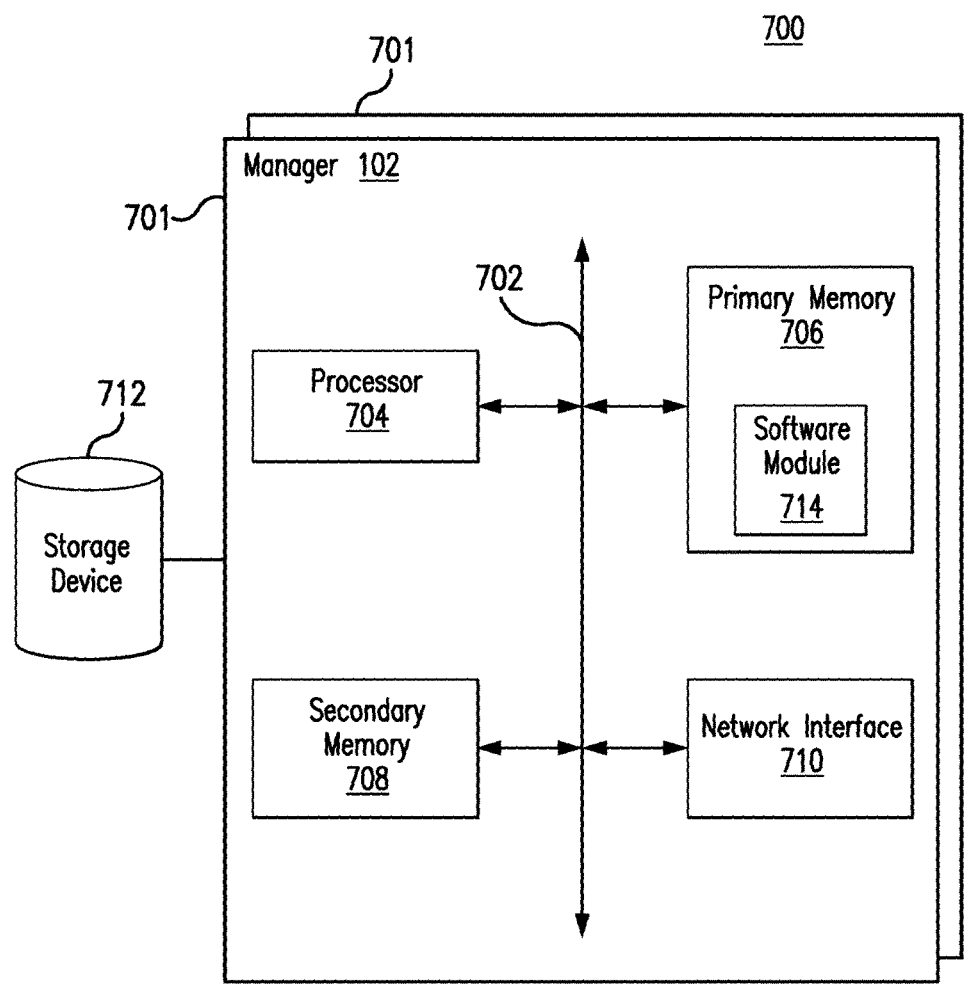
FIG. 7 is a block diagram of example regional service assurance desks and an example global service assurance desk of a service assurance network in accordance with embodiments of the disclosure.

With reference to FIG. 7, a block diagram is shown of a computer system 700 including one or more assurance desks 701. The assurance desk 701 can be a GSAD, such as GSAD 604 shown in FIG. 6, or one or more RSADs, such as RSAD 602 shown in FIG. 6. Each assurance desk 701 can include multiple processors 704 and related systems (e.g., including primary memory 706, secondary memory 708, network interface 710, and bus 702). The description above related to FIG. 2 of components bus 202, processor 204, primary memory 206, secondary memory 208, and network interface 210 corresponds and pertains to each of respective components bus 702, processor 704, primary memory 706, secondary memory 708, and network interface 710. The assurance desk 701 communicates with a storage device 712, such as for accessing and or storing data. The storage device 712 can be external or internal to the assurance desk 701. One or more software modules 714 can be stored by the primary memory 706, wherein the software modules 714 include programmable instructions that when executed by the processor 704 cause the processor to perform operations as described in the disclosure.

Figure 8:
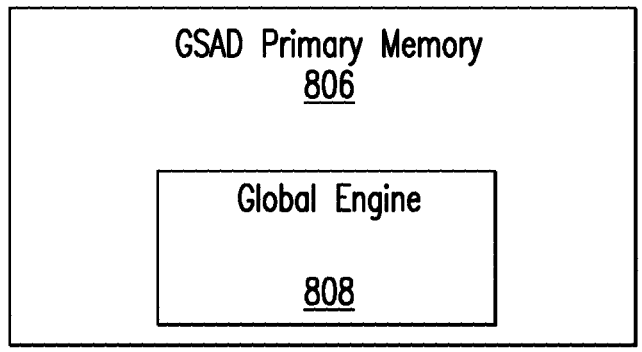
FIG. 8 is a block diagram of an example primary memory of a global service assurance desk in accordance with embodiments of the disclosure.

With reference to FIG. 8, a block diagram is shown of example software modules stored in a primary memory 806 of a GSAD, such as GSAD 604 shown in FIG. 6. The software modules shown include a global engine 808 that includes instructions for performing steps 650, 652, 654, 656, 658, and 660 shown in FIG. 6. Communications exchanged with the RSADs 602 can use a direct interface (not shown) or the network interface 710 shown in FIG. 7 for communicating via a network (not shown).

Figure 9:
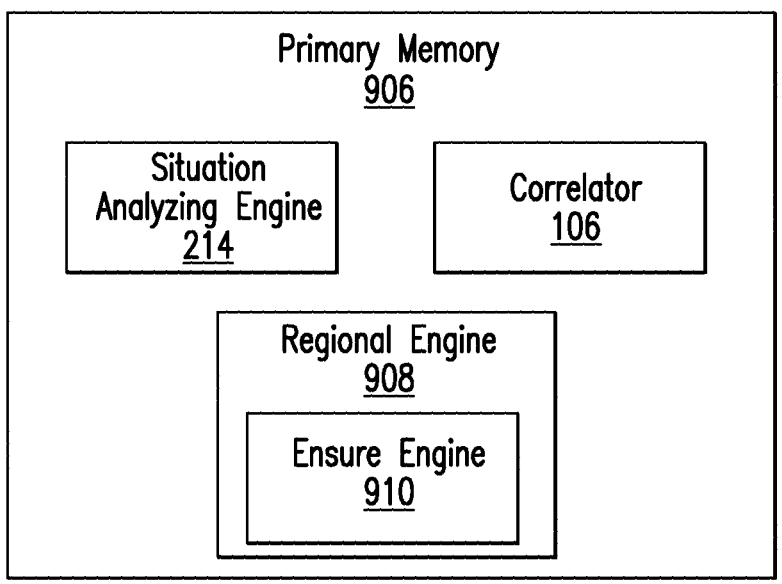
FIG. 9 is a block diagram of an example primary memory of regional service assurance desks in accordance with embodiments of the disclosure.

With reference to FIG. 9, a block diagram is shown of example software modules stored in a primary memory 906 of an RSAD, such as RSAD 602 shown in FIG. 6. The software modules shown include a regional engine 808 that includes instructions for performing steps 610, 612, 614, 616, 618, and 620 shown in FIG. 6. Communications exchanged with the GSAD 604 can use a direct interface (not shown) or the network interface 710 shown in FIG. 7 for communicating via a network (not shown). The regional engine 808 includes an ensure module 910 that performs operations to ensure that the problem identified is persistent and/or trending worse. Additionally, the RSAD can include situation correlator 106 and analyzing engine 214 described in connection with FIGS. 1 and 2, respectively.

With reference to FIG. 10, a table 1000 is shown that illustrates storage of data associated with an algorithm for determining or updating a problem's ensurance index (EI) based on persistence of the problem as indicated by observed KPI measures, e.g., ASI data. The EI index can be determined and updated based on persistence and/or the presence or absence of a downward trend associated with the observed KPI measures.

Once a problem is detected and an entry is added to the watch list, persistence can be calculated or updated, e.g., at time intervals or in response to an event, such as by using the most recent N samples. In the example shown, N=12, and the samples are sampled at five minute intervals. Each sample is assigned a respective index of indices numbered 1-N. An algorithm for determining the EI index can include determining at least one of the following:

Anomalous sample is a sample having an AI value≥1.0;
Recency weight=(sample index/Σ sample indices);
Recency value=recency weight of anomalous samples, else recency value=0;
Continuity value=maximum number of continuous occurrences of anomalous samples
Occurrence Score=Number of anomalous samples relative to total number of samples;
Recency Score=Σ recency values; and
Continuity Score=(Σ continuity values)/total number of samples.

Table 1000 includes a row 1002 that indicates the index of each sample. In the example shown, the samples have numbered indices 1-12. Entry 1004 indicates a sum of the sample indices. In the example shown, the sum of the sample indices is 78.

Row 1006 indicates an AI score for each sample, wherein the AI score is the sum of weighted KPI measures for that sample. In the example shown, the AI scores associated with samples 1-12 range between 0.0 and 1.5. Row 1008 indicates recency weight values for each sample.

Row 1010 indicates recency values for each sample. In the example shown, four of the samples that have AI scores<1.0 are assigned a recency weight value=0.0. Row 1012 indicates a continuity value associated with the set of samples. In the example shown, the continuity value=5. Row 1014 indicates the EI, which is determined using a recency score indicated in row 1016, a continuity score indicated in row 1018, and an occurrence score, shown in row 1020.

In the example shown, the recency score is a sum of the recency value associated with the eight samples that have a recency value>0, which is determined to be 0.73 (i.e., 0.15+0.14+0.13+0.12+0.10+0.05+0.03+0.01), which can be expressed as 73%. In the example shown, the continuity score is calculated by dividing the continuity value (5) by the total number of samples (12), wherein 5/12=0.42, which can be expressed as 42%. In the example shown, the occurrence score is calculated by dividing the number of anomalous samples (8) by the total number of samples (12), which is 0.67, and which can be expressed as 67%.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In addition, a global server can receive entries associated with serious problems that were detected by distributed regional servers and store the entries in a global track list. The global server can further correlate impact and cause events included in the global track list and delegate correction of the associated problems to the appropriate regional server(s), including verification of the correction until the problem is resolved. The regional servers can determine which problems are serious by ensuring that they are persistent and/or are trending worse. An algorithm for ensuring that a problem is persistent can use a combination of factors, such as: respective sample indices (1-N) assigned to N samples; the number of samples; an AI based on KPI measures (which can be weighted) associated with each sample; a determination whether a sample is anomalous based on its AI relative to a threshold or baseline value; recency values of the anomalous samples based on each anomalous sample's index relative to a sum of the samples' indices; and a maximum number of consecutive anomalous samples.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer method for performing root cause analysis of failures in a computer network, the method comprising:
   receiving, by a processor, an Adaptive Service Intelligence (ASI) data set related to one or more failures reported in the computer network from a plurality of interfaces;
   identifying, by a processor, one or more impact events associated with the one or more reported failures based on the received ASI data set;
   correlating, by a processor, each of the identified one or more impact events with one or more cause events; and
   selectively generating, by a processor, a situation record based on the correlated one or more impact events with the one or more cause events.

2. The computer method of claim 1, further comprising identifying, by a processor, a most likely cause based on the correlated one or more impact events with the one or more cause events and including the most likely cause in the generated situation record.

3. The computer method of claim 2, further comprising presenting, by a processor, the generated situation record to a user.

4. The computer method of claim 2, further comprising resuming monitoring, by a processor, the identified one or more impact events and one or more cause events associated with the situation record subsequent to the generation of the situation record if the most likely cause persists.

5. The computer method of claim 3, wherein the generated situation record comprises a graphical representation showing a relationship between the most likely cause events and the one or more impact events and showing graphical representation of context of the relationship between the one or more impact events and the one or more cause events.

6. The computer method of claim 1, further comprising, prior to the correlating step, determining, by a processor, a frequency at which the one or more impact events occurs substantially simultaneously with the one or more cause events during an analyzed time period, wherein the correlation is determined based on results of determining the frequency.

7. The computer method of claim 1, wherein identifying the one or more impact events associated with the one or more reported failures based on the received ASI data set further comprises analyzing a plurality of impact metrics, the plurality of impact metrics comprising response time, a failure rate in the computer network, one or more timeout values, relative degradation of mean opinion score (MOS), call set-up failure metrics and call drop metrics of a network node associated with a predefined key.

8. The computer method of claim 7, wherein the one or more cause events are identified by analyzing a plurality of cause metrics, the plurality of cause metrics comprising a total number of individual transactions, a total number of user sessions, a TCP Window size metric, a count of TCP Zero Windows, a rate of retransmitted packets, jitter, a server bit rate, a total number of successful call setup transactions.

9. The computer method of claim 1, further comprising identifying, by a processor, one or more dependent situation events as causes for one or more impact events associated with the generated situation record, correlating the one or more dependent situation events with the one or more impact events and generating one or more situation records for each of the one or more dependent situation events based on the correlation of the one or more dependent situation events with the one or more impact events.

10. The computer method of claim 9, wherein correlating each of the identified one or more impact events with one or more dependent events further comprises executing, by a processor, a plurality of rules, wherein each one of the plurality of rules correlates one of the plurality of impact metrics to at least one dependent cause metric from the plurality of cause metrics.

11. The computer method of claim 6, further comprising, prior to the correlating step, determining, by a processor, whether the one or more impact events align in time with the one or more cause events during the analyzed time period and using the determination results for the correlation of the one or more dependent situation events with the one or more impact events.

12. The computer method of claim 1, further comprising:
   associating an impact event with the one or more anomalous samples;
   determining a cause event of the one or more cause events based on data of the received ASI data set that is correlated with the impact event;
   ensuring the impact event based on a determination whether the anomalous samples are at least one of persistent and trending worse; and
   ensuring the cause event based on ensurance of the impact event.

13. A network device for performing root cause analysis of failures in a computer network, the network device comprising:

a network interface configured to receive program instructions to receive an Adaptive Service Intelligence (ASI) data set related to one or more failures reported in the computer network from one or more network monitoring devices positioned at one or more locations in the computer network; and an ASI processing engine configured to:
identify one or more impact events associated with the one or more reported failures based on the received ASI data set;
correlate each of the identified one or more impact events with one or more cause events; and
selectively generate a situation record based on the correlated one or more impact events with the one or more cause events.

14. The network device of claim 13, wherein the ASI processing engine is further configured to identify a most likely cause based on the correlated one or more impact events with the one or more cause events and configured to include the most likely cause in the generated situation record.

15. The network device of claim 14, wherein the ASI processing engine is further configured to present the generated situation record to a user.

16. The network device of claim 14, wherein the ASI processing engine is further configured to resume monitoring of the one or more identified impact events and the one or more cause events associated with the situation record subsequent to the generation of the situation record if the most likely cause persists.

17. The network device of claim 14, wherein the ASI processing engine is further configured to:
detect one or more anomalous samples of a series of ASI data samples of the received ASI data set based on a comparison of one or more observed KPI measurements of the ASI data samples relative to a predetermined anomaly threshold, each observed KPI measurement corresponding to a KPI measure of a plurality of KPI measures;
determine whether detection of the anomalous samples is at least one of persistent and trending worse;
ensure a problem based on the determination whether the anomalous samples are at least one of persistent and trending worse; and
report the problem only if the problem is ensured.

18. The network device of claim 17, wherein the ASI processing engine is further configured to:
access weighted values associated with at least one of respective KPI measures of the plurality of KPI measures and respective combinations of the plurality of KPI measures; and
calculate an anomaly index based on a summation of weighted values associated with KPI measures that correspond to observed KPI measurements upon which the anomaly is based,
wherein ensuring the problem is based on the anomaly index.

19. The network device of claim 17, wherein ensuring that a problem is trending worse includes determining that there is at least one of a change in a number of different KPI measures of the plurality of KPI measures that corresponds to the one or more observed KPI measurements, the observed KPI measurements have worsened by a threshold percentage relative to the predetermined anomaly threshold; and the observed KPI measurements have continued over time to worsen relative to the predetermined anomaly threshold.

20. The network device of claim 18, wherein the series of ASI data samples are spaced over time and are indexed based on their order in the series, wherein the ASI processing engine is further configured to:
determine a recency weight associated with respective samples of the series of ASI data samples based on the index associated with the sample and indices of other samples in the series of ASI data samples; and
determine a recency score based on recency values associated with samples that have an anomaly index that exceeds a predetermined anomaly index threshold,
wherein ensuring the problem is based on the recency score.

21. The network device of claim 18, wherein the series of ASI data samples are spaced over time, and the ASI processing engine is further configured to determine a maximum number of consecutive samples that have an anomaly index that exceeds a predetermined anomaly index, wherein ensuring the problem is based on the maximum number of consecutive samples.

22. The network device of claim 17, wherein reporting the problem includes reporting the problem to a global server for determination of correlation to another problem reported to the global server.

23. The network device of claim 21, wherein the ASI processing engine is further configured to:
receive instructions to at least one of (a) fix a source of a cause event correlated with an impact event of one of the other problems, and (b) monitor a component affected by an impact event correlated with a cause event of one of the other problems;
based on the instructions, at least one of (a) fix the source of a cause event and (b) monitor the affected component; and
report to the global server at least one of (a) actions performed to fix the source of a cause event and (b) results of monitoring the affected component.

24. The network device of claim 22, wherein,
the ASI data set received by the processor is received from a plurality of regional servers,
an impact event of the one or more impact events identified is based on data of the ASI data set received from a first regional server of the plurality of regional servers,
a cause event of the one or more cause events correlated with the impact event is based on data of the ASI data set received from a second regional server of the plurality of regional servers, and wherein the ASI processing engine is further configured to:
instruct the first regional server to monitor a component affected by the one or more cause events correlated with the impact event; and
instruct the second regional server to fix a source of the cause event.

25. The network device of claim 15, wherein the generated situation record comprises a graphical representation showing a relationship between the most likely cause events and the one or more impact events and showing graphical representation of context of the relationship between the one or more impact events and the one or more cause events.

26. The network device of claim 13, wherein the ASI processing engine is further configured to, prior to the correlation, determine a frequency at which the one or more impact events occurs substantially simultaneously with the one or more cause events during an analyzed time period.

27. The network device of claim 13, wherein the ASI processing engine configured to identify the one or more impact events associated with the one or more reported failures based on the received ASI data set is further configured to analyze a plurality of impact metrics, the plurality of impact metrics comprising response time, a failure rate in the computer network, one or more timeout values, relative degradation of mean opinion score (MOS), call set-up failure metrics and call drop metrics of a network node associated with a predefined key.

28. The network device of claim 27, wherein the ASI processing engine configured to identify the one or more cause events is further configured to analyze a plurality of cause metrics, the plurality of cause metrics comprising a total number of individual transactions, a total number of user sessions, a TCP Window size metric, a count of TCP Zero Windows, a rate of retransmitted packets, jitter, a server bit rate, a total number of successful call setup transactions.

29. A non-transitory computer readable storage medium structured to store instructions, the instructions when executed, cause a processor in a network device for performing root cause analysis to:
  receive an Adaptive Service Intelligence (ASI) data set related to one or more failures reported in a computer network from a plurality of interfaces;
  identify one or more impact events associated with the one or more reported failures based on the received ASI data set;
  correlate each of the identified one or more impact events with one or more cause events; and
  selectively generate a situation record based on the correlated one or more impact events with the one or more cause events.

30. The non-transitory computer readable storage medium of claim 29, wherein the instructions, when executed by the processor further cause the processor to:
  detect one or more anomalous samples of a series of ASI data samples of the received ASI data set based on a comparison of one or more observed KPI measurements of the ASI data samples relative to a predetermined anomaly threshold, each observed KPI measurement corresponding to a KPI measure of a plurality of KPI measures;
  determine whether detection of the anomalous samples is at least one of persistent and trending worse;
  ensure a problem based on the determination whether the anomalous samples are at least one of persistent and trending worse; and
  report the problem only if the problem is ensured.

31. A computer method to detect and manage a problem in a computer network, the method comprising:
  receiving, by a processor, an Adaptive Service Intelligence (ASI) data set related to one or more failures reported in the computer network from a plurality of interfaces;
  detecting one or more anomalous samples of a series of ASI data samples of the ASI data set based on a comparison of one or more observed KPI measurements of the ASI data samples relative to a predetermined anomaly threshold, each observed KPI measurement corresponding to a KPI measure of a plurality of KPI measures;
  determining whether detection of the one or more anomalous samples is at least one of persistent and trending worse;
  ensuring a problem based on the determination whether the one or more anomalous samples are at least one of persistent and trending worse; and
  reporting the problem only if the problem is ensured.

32. The computer method of claim 31, further comprising:
  accessing weighted values associated with at least one of respective KPI measures of the plurality of KPI measures and respective combinations of the plurality of KPI measures; and
  calculating an anomaly index based on a summation of weighted values associated with KPI measures that correspond to observed KPI measurements upon which the calculated anomaly is based,
  wherein ensuring the problem is based on the anomaly index.

33. The computer method of claim 31, wherein ensuring that a problem is trending worse includes determining that there is at least one of a change in a number of different KPI measures of the plurality of KPI measures that corresponds to the one or more observed KPI measurements, the one or more observed KPI measurements have worsened by a threshold percentage relative to the predetermined anomaly threshold; and the observed KPI measurements have continued over time to worsen relative to the predetermined anomaly threshold.

34. The computer method of claim 31, further comprising:
  determining a classification of severity of the problem from at least two classification based on the comparison of the one or more observed KPI measurements relative to the anomaly predetermined threshold; and
  generating a graphical user interface (GUI),
  wherein reporting the problem includes displaying an indicator in the GUI that indicates the determined classification of the severity of the problem and a number of instances that the problem was detected.

35. The computer method of claim 32, wherein the series of ASI data samples are spaced over time and are indexed based on their order in the series, the method further comprising:
  determining a recency weight associated with respective samples of the series of ASI data samples based on the index associated with the sample and indices of other samples in the series of ASI data samples; and
  determining a recency score based on recency values associated with samples that have an anomaly index that exceeds a predetermined anomaly index threshold,
  wherein ensuring the problem is based on the recency score.

36. The computer method of claim 31, wherein the series of ASI data samples are spaced over time, the method further comprising determining a maximum number of consecutive samples that have an anomaly index that exceeds a predetermined anomaly index, wherein ensuring the problem is based on the maximum number of consecutive samples.

37. The computer method of claim 31, further comprising:
  continuing to track a problem that has been ensured by determining whether detection of associated anomalous samples is at least one of persistent and trending worse; and
  discontinuing tracking the problem when it is determined that the detection of the associated anomalous samples is no longer at least one of persistent and trending worse.

38. The computer method of claim 31, wherein reporting the problem includes reporting the problem to a global server for determination of correlation to another problem reported to the global server.

39. The computer method of claim 38, further comprising:
  receiving instructions to at least one of (a) fix a source of a cause event correlated with an impact event of one of the other problems, and (b) monitor a component affected by an impact event correlated with a cause event of one of the other problems;

based on the instructions, at least one of (a) fixing the source of a cause event and (b) monitoring the affected component; and reporting to the global server at least one of (a) actions performed to fix the source of a cause event and (b) results of monitoring the affected component.

40. The computer method according to claim 38, wherein, the ASI data set received by the processor is received from a plurality of regional servers, an impact event of the one or more impact events identified is based on data of the ASI data set received from a first regional server of the plurality of regional servers, a cause event of the one or more cause events correlated with the impact event is based on data of the ASI data set received from a second regional server of the plurality of regional servers, and the method further comprises:
  instructing the first regional server to monitor a component affected by the tone or more cause events correlated with the impact event; and
  instructing the second regional server to fix a source of the cause event.

* * * * *